(No Model.)

S. JOEL.
HAND VISE.

No. 356,540.                        Patented Jan. 25, 1887.

Witnesses
James D. Griswold
Geo. Wadman

Inventor
Saml Joel
By his Attorneys.
Gifford & Brown

UNITED STATES PATENT OFFICE.

SAMUEL JOEL, OF NEW YORK, N. Y.

HAND-VISE.

SPECIFICATION forming part of Letters Patent No. 356,540, dated January 25, 1887.

Application filed July 15, 1886. Serial No. 208,138. (No model.)

*To all whom it may concern:*

Be it known that I, SAMUEL JOEL, of New York, in the county and State of New York, have invented a certain new and useful Improvement in Hand-Vises, of which the following is a specification.

My improvement relates, particularly, to hand-vises of the kind which are used by jewelers for holding settings while precious stones are being secured therein.

The improvement consists in the combination of a hand-piece, levers fulcrumed thereto and extended along adjacent to the hand-piece so that they may be grasped for manipulating them, and a collar embracing said levers and made adjustable along the hand-piece so that it may be made to clamp or release the levers.

Figure 1:
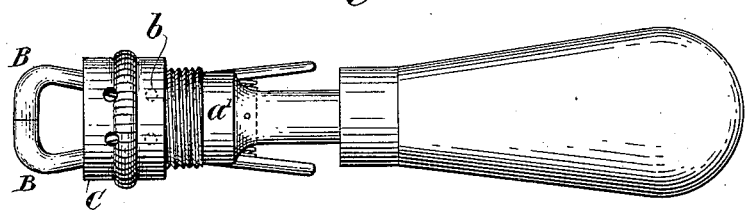
Figure 2:
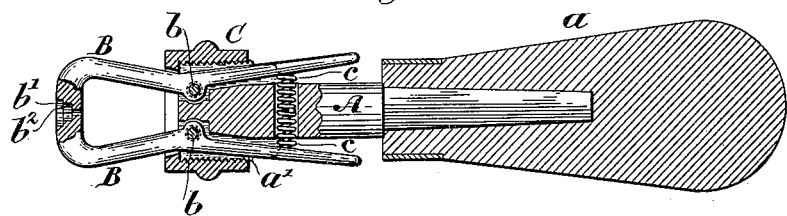
Figure 3:

In the accompanying drawings, Figure 1 is a side view of a hand-vise embodying my improvement. Fig. 2 is a longitudinal section of this hand-vise. Fig. 3 is an end view thereof.

Similar letters of reference designate corresponding parts in all the figures.

A designates the hand-piece of the vise. It may be made of metal, and, preferably, will have at the end which is to be grasped by the hand a cover of wood, $a$. It has an enlarged portion, $a'$, at one end, and this enlarged portion $a'$ is grooved at opposite points to accommodate levers B, forming the jaws of the vise. The grooves extend throughout the lengths of the enlarged portion $a'$. These levers are fitted into the grooves, and secured in place by fulcrum-pins $b$, extending through walls of the grooves and through said levers. The outer ends of the levers are bent toward each other, and have one or more seats consisting of arc-shaped grooves or cavities $b'$ $b^2$, formed in them. The inner ends of the levers extend outward beyond the rear ends of said grooves and normally away from the hand-piece into a position to be grasped by hand. Springs $c$, arranged between these ends of the levers and inserted in the hand-piece, tend to force these arms of the levers outwardly, and consequently the other arms of the levers toward each other.

When a setting is to be secured in the vise, the inner arms of the levers B will be pressed toward the hand-piece, so as to spread the ends of the other arms of the levers apart, in order that the setting may be fitted in one of the seats therein. When the inner arms of the levers are released, the springs $c$ will cause the outer arms of the levers to secure the setting.

The enlarged portion $a'$ of the hand-piece is externally screw-threaded and fitted thereto as an internally-screw-threaded collar, C. This collar may be adjusted so as to embrace the outer arms of the levers B at a part where they diverge for the purpose of securely clamping them after they have been closed upon the setting inserted between them. When the setting has to be released, this collar C will be run backward upon the hand-piece, and the inner arms of the levers will be pressed toward the hand-piece, so as to swing the outer arms apart and cause them to release the setting. It will be seen that the collar acts on the outer surfaces of the levers at a point between their fulcra and the jaws of the levers.

At the outer edge the collar C has an inwardly-turned flange, which may abut against the outer end of the hand-piece to limit the adjustment of the collar in one direction. The outer arms of the levers will limit the adjustment of the collar in the other direction.

In the collar are holes corresponding in position to the fulcra of the levers. They provide for the insertion of the fulcra of the levers into their places.

What I claim as my invention, and desire to secure by Letters Patent, is—

The combination, with a hand-piece comprising a screw-threaded enlarged portion, as $a'$, provided with longitudinal grooves extending throughout its length, of levers fulcrumed within said grooves, and having their outer arms extending toward each other to form jaws and their inner arms extending outward beyond the rear ends of said grooves and normally away from the hand-piece into a position to be grasped by hand, a spring for forcing the jaws of the levers together, and a collar adjustable along the said enlarged portion of the hand-piece to clamp the jaws after they have been closed, substantially as specified.

SAMUEL JOEL.

Witnesses:
D. H. DRISCOLL,
CHAS. T. WARD.